(12) United States Patent
Singhal

(10) Patent No.: US 12,086,606 B2
(45) Date of Patent: Sep. 10, 2024

(54) BOOTSTRAPPING A MICROSERVICES REGISTRY

(71) Applicant: Nutanix, Inc., San Jose, CA (US)

(72) Inventor: Pravin Singhal, Cupertino, CA (US)

(73) Assignee: Nutanix, Inc., San Jose, CA (US)

(*) Notice: Subject to any disclaimer, the term of this patent is extended or adjusted under 35 U.S.C. 154(b) by 5 days.

(21) Appl. No.: 18/176,473

(22) Filed: Feb. 28, 2023

(65) Prior Publication Data

US 2023/0385069 A1 Nov. 30, 2023

Related U.S. Application Data

(63) Continuation of application No. 16/863,651, filed on Apr. 30, 2020, now Pat. No. 11,593,118.

(60) Provisional application No. 62/983,343, filed on Feb. 28, 2020.

(51) Int. Cl.
G06F 9/00 (2018.01)
G06F 8/61 (2018.01)
G06F 9/4401 (2018.01)

(52) U.S. Cl.
CPC .............. *G06F 9/4403* (2013.01); *G06F 8/61* (2013.01)

(58) Field of Classification Search
CPC ....... G06F 9/4403; G06F 9/45533; G06F 8/61
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,772,866 B1 | 9/2017 | Aron et al. |
| 10,013,275 B2 | 7/2018 | Vyas et al. |
| 10,579,367 B2 | 3/2020 | Lander et al. |
| 11,194,632 B2 | 12/2021 | Singhal et al. |
| 11,218,418 B2 | 1/2022 | Gupta et al. |
| 11,561,868 B1 | 1/2023 | Poornachandran et al. |

(Continued)

OTHER PUBLICATIONS

Non-Final Office Action for U.S. Appl. No. 16/863,651 dated May 20, 2022.

(Continued)

*Primary Examiner* — Nitin C Patel
(74) *Attorney, Agent, or Firm* — Vista IP Law Group, LLP

(57) ABSTRACT

Bootstrapping a microservices container registry. A computing system node receives an installation package. The receiving computing system node bootstraps an initial invocation of the microservice by first installing a local container registry from the installation package and then by installing the microservice from the installation package. The installation package contains additional components that can be extracted, installed and invoked by executing the microservice at the computing system node after extracting from the local container registry. The installation package is generated by any node of the computing system and contains code corresponding to infrastructure microservices that are installed before invoking microservices that depend on the infrastructure. Temporary domain name services are installed from the installation package at a node-local IP address. The temporary domain name services are switched over to a different domain name service at a different IP address. A second computing system node is designated as a failover node.

21 Claims, 13 Drawing Sheets

(56) References Cited

U.S. PATENT DOCUMENTS

| | | | |
|---|---|---|---|
| 2017/0329588 | A1 | 11/2017 | Lundberg et al. |
| 2018/0075152 | A1 | 3/2018 | Zhang |
| 2018/0088935 | A1* | 3/2018 | Church .............. G06F 11/3051 |
| 2018/0270125 | A1 | 9/2018 | Jain et al. |
| 2020/0159557 | A1* | 5/2020 | Pasupathy ........... H04L 67/1097 |
| 2021/0216291 | A1 | 7/2021 | White |

OTHER PUBLICATIONS

Notice of Allowance for U.S. Appl. No. 16/863,651 dated Oct. 31, 2022.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

Dubois, J., "Bootstrapping Your Microservices Architecture with JHipster and Spring", Herooku Blog, (Apr. 21, 2016).

Mouat, A., "The Red Hat Ecosystem for Microservice and Container Development", Red Hat, Inc., (Feb. 23, 2016).

IBM, "Deploying microservices to Azure Kubernetes Service", IBM, (Aug. 13, 2019).

Oracle, "Deploy microservices to a Kubernetes cluster", Oracle, (Last updated on Jan. 5, 2021).

Oracle, "Pulling Images from Registry during Kubernetes Deployment", Oracle, (Jun. 7, 2021), publication date unknown; date retrieve from google.

Firebase, "Serve dynamic content and host microservices with Cloud Run", Firebase, (Oct. 9, 2020), publication date unknown; date retrieve from google.

Wikipedia, "Qcow", Wikipedia, (Last edited on Nov. 29, 2019).

Poitras, Steven. "The Nutanix Bible" (Sep. 9, 2022), from https://nutanixbible.com/ (Publication date based on indicated capture date by Archive.org; first publication date unknown).

"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.

Pakrijauskas, K., et al., "A Method of Transparent Graceful Failover in Low Latency Stateful Microservices," Department of Information Systems, Faculty of Fundamental Sciences, Vilnius Gediminas Technical University, Electronics 2022, 11, 3936.

George, T., "Microservices registration and discovery using Consul," Equinix Developer Platform, dated Aug. 6, 2018.

* cited by examiner

BOOTSTRAPPING A MICROSERVICES REGISTRY

RELATED APPLICATIONS

The present application is a continuation of U.S. application Ser. No. 16/863,651, now U.S. patent Ser. No. 11/593,118, titled "BOOTSTRAPPING A MICROSERVICES REGISTRY", filed on Apr. 30, 2020, which claims the benefit of priority to U.S. Patent Application No. 62/983,343 titled "BOOTSTRAPPING A MICROSERVICES REGISTRY", filed on Feb. 28, 2020, which is hereby incorporated by reference in its entirety.

TECHNICAL FIELD

This disclosure relates to microservice deployment, and more particularly to techniques for bootstrapping infrastructure microservices.

BACKGROUND

As applications move from virtual machines to executable containers, their deployment models also change. Unlike virtual machine images, executable container images are deployed in observance of a layered file system. Executable containers use these layered file systems. The executable containers and constituent components taken from the layered file system are building blocks for applications, where each executable container is a READ/WRITE image having access to many read-only layers. The are several possible approaches to addresses this problem, some of which are discussed hereunder:

One approach relies on a download of an executable container image from some container registry. However, in order to access the executable container for download, the registry needs to exist, and this registry has to be populated before the application that will be in and/or using the executable containers is started. The registry and its components as well as a protocol to access the registry serve to access and assemble only those layers that are both (1) needed by the containerized application, and (2) not already downloaded. Most applications are delivered in multiple executable containers and, as such, and most of the time, there are many common layers. As such, each of the multiple executable containers that form the application may differ only in their respective container-specific layer. This can result in a very efficient and fast download mechanism, however this model suffers from several deficiencies as detailed below.

Other approaches package the container images as a "tar" or "gzip" file, such as the well-known "tar.gz". The tar file includes all of the layers required to bring up the container in a single download including all the layers of the container as mentioned above. These saved images then need to be downloaded at an application deployment site and loaded into a local executable instance which, in turn, will load the images into a container-friendly file system.

Deficiencies in These Approaches

Many applications that are deployed as microservices use the former approach that relies on a download of an executable container image from some container registry. To facilitate efficiency when following this approach, highly available container registries are made available (e.g., in other on-premises facilities and/or in various computing clouds). Enterprise-managed systems operate to push the pre-built container images into this highly available container registry. Applications that use these containers download them through one of the highly available container registry sites at the time of their deployment. However, there is a class of applications called "infrastructure applications," that have to be operational before any other (non-infrastructure) classes of applications (e.g., business applications) can be made operational. In the situation where these "infrastructure applications" are deployed as microservices, they rely on certain computing infrastructure being available at the time of the invocation. In such situations, these non-infrastructure microservices cannot run in the absence of such relied-on infrastructure. This sets up a "chicken-and-egg" problem such that any "infrastructure application" that is deployed as a microservice cannot bootstrap itself.

In circumstances where an infrastructure microservice is to be deployed, the latter tar.gz approach could be used instead of the former download approach. Unfortunately, the tar.gz approach often results in very large images for each and every container. As such, the total size of downloaded image data often becomes huge and thus the download times are correspondingly huge, which leads to poor performance. What is needed is a way to deploy infrastructure microservices in a manner that overcomes the "chicken-and-egg" problem as well as the performance problems and limitations of download approaches.

SUMMARY

This summary is provided to introduce a selection of concepts that are further described below. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particularly desirable attribute or end result.

The present disclosure describes techniques used in systems, methods, and in computer program products for bootstrapping a microservices platform, including a self-contained microservices registry, which techniques advance the relevant technologies to address technological issues with legacy approaches. More specifically, the present disclosure describes techniques used in systems, methods, and in computer program products for deploying a highly available container registry in a microservices platform. Certain embodiments are directed to technological solutions for deploying specially-constructed microservice registries into a node image before instancing the image to a node.

The disclosed embodiments modify and improve over legacy approaches. In particular, the herein-disclosed techniques provide technical solutions that address the technical problems attendant to bootstrapping infrastructure microservices. Such technical solutions involve specific implementations (i.e., data organization, data communications paths, module-to-module interrelationships, etc.) that relate to the software arts for improving computer functionality. Various applications of the herein-disclosed improvements in computer functionality serve to reduce demands for computer memory, reduce demands for computer processing power, reduce network bandwidth usage, and reduce demands for intercomponent communication. For example, when performing computer operations for bootstrapping infrastructure microservices, both memory usage and CPU cycles demanded are significantly reduced as compared to the memory usage and CPU cycles that would be needed but for practice of the herein-disclosed techniques for deploying a specially-constructed microservice registry into a node image before instancing the image to a node. Strictly as one example, pre-built registries often results in very large images for each and every container, sometime duplicating very significant amounts of content for each container. As such, the total size of image data enormous, which leads to poor performance when attempting to deploy a microservice to a node.

Many of the herein-disclosed embodiments for deploying a specially-constructed microservice registry into a node image before instancing the image to a node are technological solutions pertaining to technological problems that arise in the hardware and software arts that underlie computing clusters. Aspects of the present disclosure achieve performance and other improvements in peripheral technical fields including, but not limited to, hyperconverged computing platform management and management of highly-available microservices.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
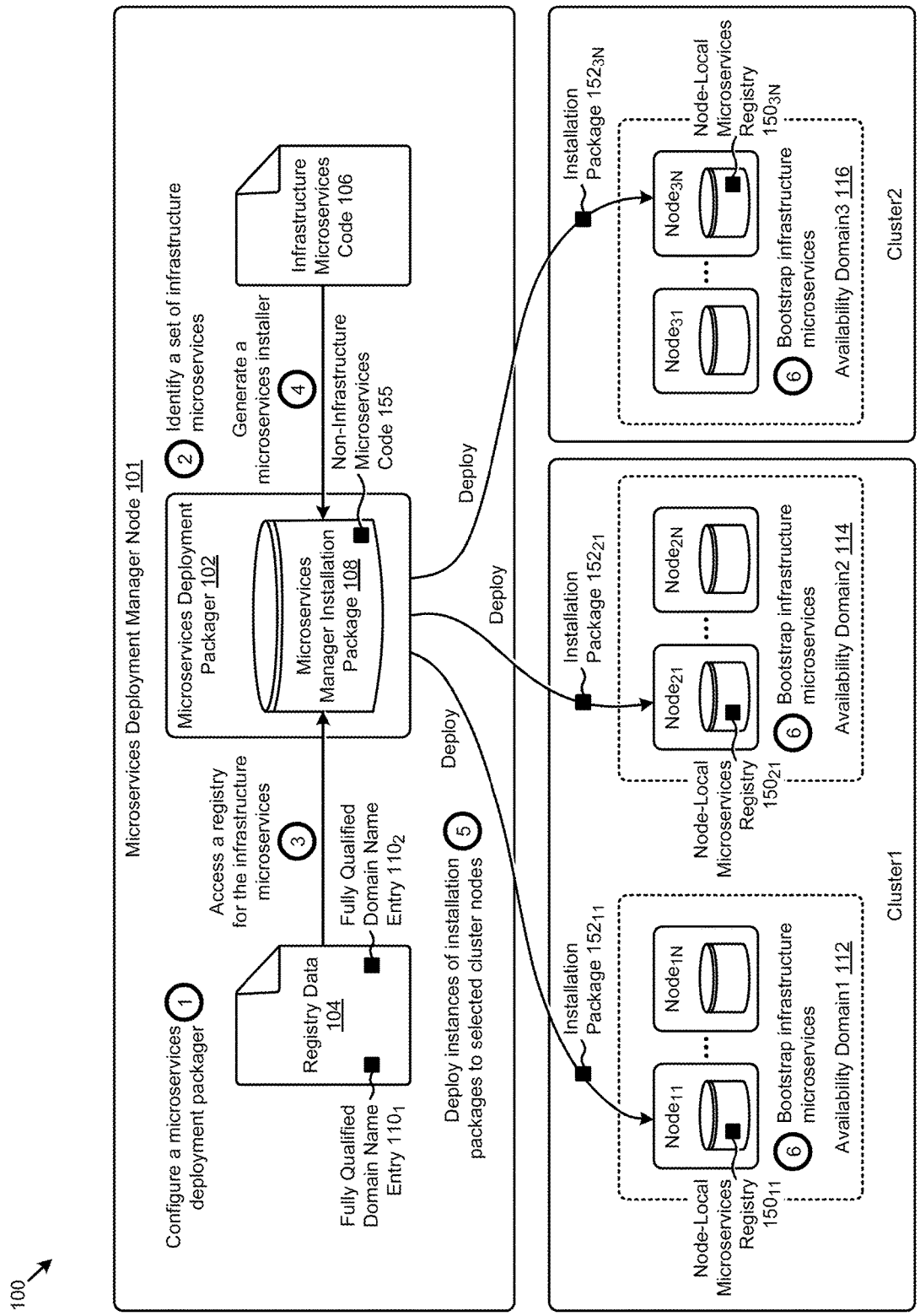
FIG. 1 exemplifies an environment in which a microservices registry can be bootstrapped, according to an embodiment.

Aspects of the present disclosure solve problems associated with using computer systems for bootstrapping infrastructure microservices. These problems are unique to, and may have been created by, various computer-implemented methods for bootstrapping infrastructure microservices in the context of computing clusters. Some embodiments are directed to approaches for deploying a specially-constructed microservice registry to a computing system node. The accompanying figures and discussions herein present example environments, systems, methods, and computer program products for deploying a highly available container registry in a microservices platform.

Overview

In modern computing systems (e.g., clusters, virtualized cluster, etc.) there emerges a class of applications, sometimes called "infrastructure applications," that have to be operational before any non-infrastructure classes of applications (e.g., business applications) can be made operational. In the situation where all or part of these "infrastructure applications" are deployed as microservices, these infrastructure microservices might rely on the availability of certain computing equipment configurations. In such situations, these aforementioned non-infrastructure microservices cannot run in the absence of relied-on infrastructure. This sets up a "chicken-and-egg" problem such that any "infrastructure application" that is deployed as a microservice must be able to self-configure itself before any non-infrastructure applications can be reliably invoked. It often happens that the computing system node to which microservices are deployed might not be configured before the infrastructure microservices are slated to run. Accordingly, the infrastructure microservices need to "bootstrap" themselves. This is because, in order to run any containerized microservice of any type, there needs to be a microservices container registry accessible to a microservice caller. As used herein, a microservices container registry is a stateless, server side application that stores executable images. One example of a microservices container registry is a Docker registry. An orchestrator (e.g., open-source container-orchestration package such as Kubernetes) may be used to facilitate operations over a Docker registry. Container registry contents (e.g., an executable container comprising a microservice) can be accessed through such a microservices container registry. The contents can be accessed by a name of an image. Illustrative embodiments herein access registry contents for bootstrapping. The container registry contents can be extracted, decompressed if needed, and instantiated as a bootstrappable executable.

To accommodate microservice bootstrapping—where an infrastructure microservice that is needed by a corresponding infrastructure application needs to be brought up—a microservices deployment packager assembles the needed components, including a microservices container registry, into an executable installer such that, upon execution of the executable installer, some or all of the components that are loaded into the executable installer execute so as to configure the computing system node on which the microservices are to be brought up.

The aforementioned installer can be packaged and deployed via many different techniques depending on characteristics of (1) the node that performs the packaging, and (2) characteristics of the target node.

Containerized Components

Many modern computing systems use executable containers to deploy runnable code. As such, it is often convenient for a microservices deployment packager to assemble sets of containers of runnable code, bring them into an installer, and then deploy the installer to a node for bootstrapping. In many cases, these executable containers include the portions of an operating system (OS) that might be needed during execution. As such, a target node need not host a fully-configured OS.

Strictly as one example, a microservices deployment packager running on a first node of a computing cluster forms a container-based installer that includes a registry for deployment as a local container registry. This local container registry can be implemented within a virtual machine (VM) that uses one or more virtual disks (vDisks) that are persisted in high-availability storage. As used herein a local container registry is a data structure that is stored at and accessible to particular computing node, which data structure is populated with executable code corresponding to a set of microservices. Such a local container registry may be associated with a node-local IP address.

A selected set of containers as may be required for a particular application are incorporated into this container registry. Any microservice call (e.g., from an application running on a node) can be properly routed to the location (e.g., endpoint) of the microservice using domain name services (DNS).

As another example, a microservices deployment packager running on a first node of a computing cluster forms a container-based installer that includes code for a microservices platform. This microservices platform might include support libraries, configuration data, rules and/or protocols for initialization of, and operation in, a high-availability mode involving leader/follower nodes that are situated within different availability zones.

Further details regarding general approaches to deploying a microservices platform are described in U.S. application Ser. No. 16/528,491 titled "DEPLOYING MICROSERVICES INTO VIRTUALIZED COMPUTING SYSTEMS", filed on Jul. 31, 2019, which is hereby incorporated by reference in its entirety.

Use of Layered File System Formats

A container registry file system can be implemented in a layered file system that contains any number of executable containers that are configured such that each executable container is a READ/WRITE image having access to many read-only layers. The container registry file system stores any number of uploaded images into the layered file system. In one embodiment, this stored container registry file system can be converted from the aforementioned vDisk format into a QEMU copy-on-write (qcow) image. This registry qcow consists of all the containers required by the platform to bootstrap on a node.

Infrastructure Bootstrapping/Deployment at a Customer Site

The registry qcow is dynamically downloaded to the customer site. The bootstrapping procedure then creates a high-availability volume group from the registry qcow. A registry container instance is created with this attached volume group. This results in a registry having all images required to deploy, all of which are pre-populated into this registry. Once this is done, the application can be bootstrapped. There is no need to download large tar files for each container image at deployment time. Once deployed and bootstrapped, the high availability of this registry is maintained.

Domain Name Services

In some embodiments, a local registry is deployed as a container that is hosted on a single virtual machine with an attached volume. All other virtual machines can download images from this high-availability registry. The download point is codified as a fully qualified domain name (FQDN). The FQDN is populated into an internal DNS (e.g., a tiny DNS server) deployed by the infrastructure. At some point after bootstrapping, a cluster-wide DNS server can be deployed onto any node of the cluster.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies an environment 100 in which a microservices registry can be bootstrapped. As an option, one or more variations of environment 100 or any aspect thereof may be implemented in the context of the architecture and functionality of the embodiments described herein.

The figure is being presented to show how a microservices deployment packager 102 can deploy instances of a microservices manager installation package 108 into different availability zones. More specifically, the figure is being presented to show how a microservices deployment packager 102 running on a microservices deployment manager node 101 can assemble and package registry data 104 and infrastructure microservices code 106 into installation packages (e.g., installation package $152_{11}$, installation package $152_{21}$, ..., installation package $152_{3N}$) that are received by computing nodes, such as a selected one or more of the shown $Node_{11}$, ..., $Node_{1N}$; $Node_{21}$, ..., $Node_{2N}$;

Node$_{31}$, . . . , Node$_{3N}$, and then used by those particular nodes to bootstrap infrastructure microservices. As used herein, an installation package is a collection of data and executable code (e.g., binary code, scripts, etc.), and including a container registry, which executable code can be invoked on a target node to initially install and execute code that brings up a container registry. In some embodiments, an installation package is configured to self-extract and/or self-unpack any or all of the collection of data and executable code. More specifically, the collection of data and executable code may include a script that extracts and invokes microservices in a specific order. For example, the script may extract and invoke infrastructure microservices before extracting and invoking any non-infrastructure microservice. In some embodiments, an installation package is configured for self-unpacking in entirety before performing any self-invocation of any or all of the collection executable code. In some embodiments, an installation package is configured for self-unpacking only specific infrastructure microservices and for self-unpacking only specific non-infrastructure microservices. As used herein, infrastructure microservices are implemented by code that configures computing capabilities in a computing node such that microservices that need said computing capabilities can be run. As used herein, an infrastructure microservice does not have any prerequisite for any non-infrastructure microservice, whereas non-infrastructure microservices rely on facilities that had been configured before running the non-infrastructure microservices. For invoking a microservice, whether an infrastructure microservice or a non-infrastructure microservice, a bootstrapped node-local microservices registry is needed.

As such, and as shown, the nodes that receive an installation package implement corresponding node-local microservices registries (e.g., node-local microservices registry $150_{11}$, node-local microservices registry $150_{21}$, node-local microservices registry $150_{3N}$). Once the node-local microservices registries have been made accessible at a corresponding node, infrastructure microservices code 106 that is included in the installation package can be invoked. Invocation of a particular microservice at a particular endpoint is facilitated by a combination of the registry data 104 and some mechanism to translate the fully qualified domain name entry (e.g., fully qualified domain name entry $110_1$, fully qualified domain name entry $110_2$) corresponding to the particular microservice to a node-local entry point for the particular microservice. In some cases, the translation temporarily directs (e.g., using node-local domain name services) a microservices call for a particular microservice (e.g., via its fully qualified domain name) to a location at the subject node.

More specifically, after running the installation package on a subject node, a microservices caller running on the subject node can access endpoints at that node. The installer is organized such that code corresponding to the infrastructure microservices code 106 is executed before invocation of any non-infrastructure microservices code 155. As such, and using the specially configured, node-specific installation package, a node can bootstrap itself to bring-up infrastructure microservices. In some cases, a particular subject node need not host the same operating system as is used by any of the infrastructure microservices.

High Availability Configurations

FIG. 1 shows the nodes as being distributed across several availability domains (e.g., availability domain1 112, availability domain2 114, availability domain3 116). Moreover FIG. 1 also shows the installation packages being directed to one node in each of the shown availability zones. In the configuration within cluster1, since there are two nodes that are able to bootstrap themselves with infrastructure microservices, and since those two nodes have been deployed into two different availability domains, then those two nodes can be designated to operate in a leader/follower configuration such that if a node designated as a leader in one availability domain becomes unreachable, the other designated node in the other availability domain can be become the leader for the cluster.

The microservices deployment manager node 101 can carry out steps in cooperation with any node in any cluster. In the scenario of FIG. 1, the microservices deployment manager node configures a microservices deployment packager (operation 1). An agent on the microservices deployment manager node, possibly the microservices deployment packager 102, can then be configured to identify a set of infrastructure microservices (operation 2). For each such individual ones of the set of infrastructure microservices, registry data 104 is accessed and a corresponding fully qualified domain name entry (e.g., fully qualified domain name entry $110_1$, fully qualified domain name entry $110_2$) is identified (operation 3). Given the set of infrastructure microservices and corresponding FQDNs, the microservices deployment packager 102 sets about to generate a microservices installer (operation 4), possibly one installer for each of the identified infrastructure microservices.

In example embodiments, multiple microservices installers are combined into an installation package and, in some cases, the installation package includes code for one or more non-infrastructure microservices (e.g., non-infrastructure microservices code 155). The installation packages might be individually configured for deployment into a particular node. For example, for a target node that has specialized hardware components installed (e.g., graphics accelerators) the installation package might include one or more infrastructure microservices that avail of the specialized hardware, whereas, for a target node that does not have specialized hardware components installed, the installation package would not include such infrastructure microservices.

The installation packages are deployed (operation 5) to cluster nodes. Upon receipt of an installation package, the receiving node runs executable portions of the installation package to bootstrap the infrastructure microservices (operation 6).

Figure 2:
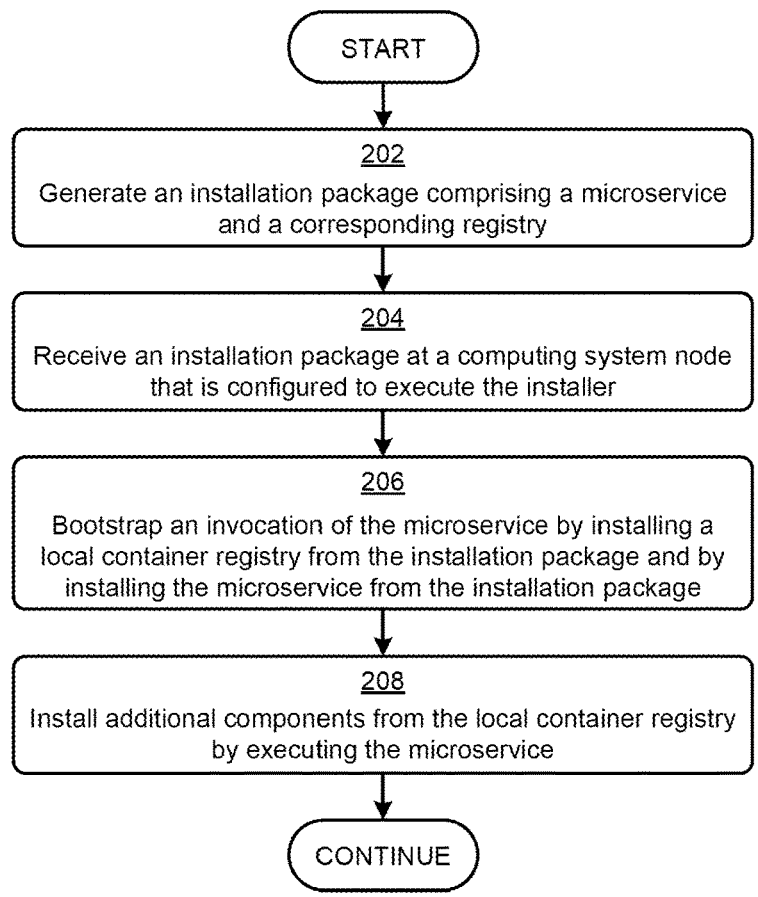
FIG. 2 presents a flow showing steps for bootstrapping a microservices registry, according to an embodiment.

FIG. 2 presents a flow showing steps for bootstrapping a microservices registry. As an option, one or more variations of flow 200 or any aspect thereof may be implemented in the context of the architecture and functionality of the embodiments described herein. The flow 200 or any aspect thereof may be implemented in any environment.

The figure depicts steps as may be implemented in the context of the embodiments described herein. Specifically, the shown flow commences by generating an installation package comprising a microservice (e.g., an infrastructure microservice) and a corresponding registry (step 202). In this and other cases, the installation package also includes code that implements at least a portion of a domain name service (DNS).

When the installation package has been generated, instances of the installation package are deployed to selected computing systems. When a computing system node receives the installation package (step 204), the computing system node will execute a first series of steps to extract and install a node-local registry (e.g., a node-local container registry) at the computing system node (step 206). In this embodiment, the node-local registry is made accessible at an a priori known local IP such that, using the code that implements at least a portion of the domain name services, a node-local DNS can be configured to resolve from a certain specific domain name address (e.g., the FQDN of the microservice) to a node-local IP address. Using the installation package, a second series of steps is executed to install additional components (step 208) and invoke the microservice, which in turn can access the registry through the node-local DNS. In this sense, and as used herein, the term bootstrapping refers an ability of a computing node to self-install code and data from an installation package. More specifically, the term bootstrapping, in the context of the present disclosure refers to bringing up a local microservices container registry onto a target node by having the target node execute an installation package to extract and install all of the components that would be needed for an infrastructure microservice to run. As further discussed, and as pertains to embodiments disclosed herein, bring-up of a microservices container registry at a target node has no pre-installation dependencies. In some embodiments, bring-up of a local microservices container registry at a target node can be accomplished solely by executing all or a portion of the installation package. In some of the illustrative embodiments, a target computing node needs only a basic input/output system (BIOS) to be able to self-install code and data from an installation package. In some embodiments, a target computing node needs only a pre-boot execution environment (PXE) to be able to retrieve and self-install code and data from an installation package.

Figure 3A:
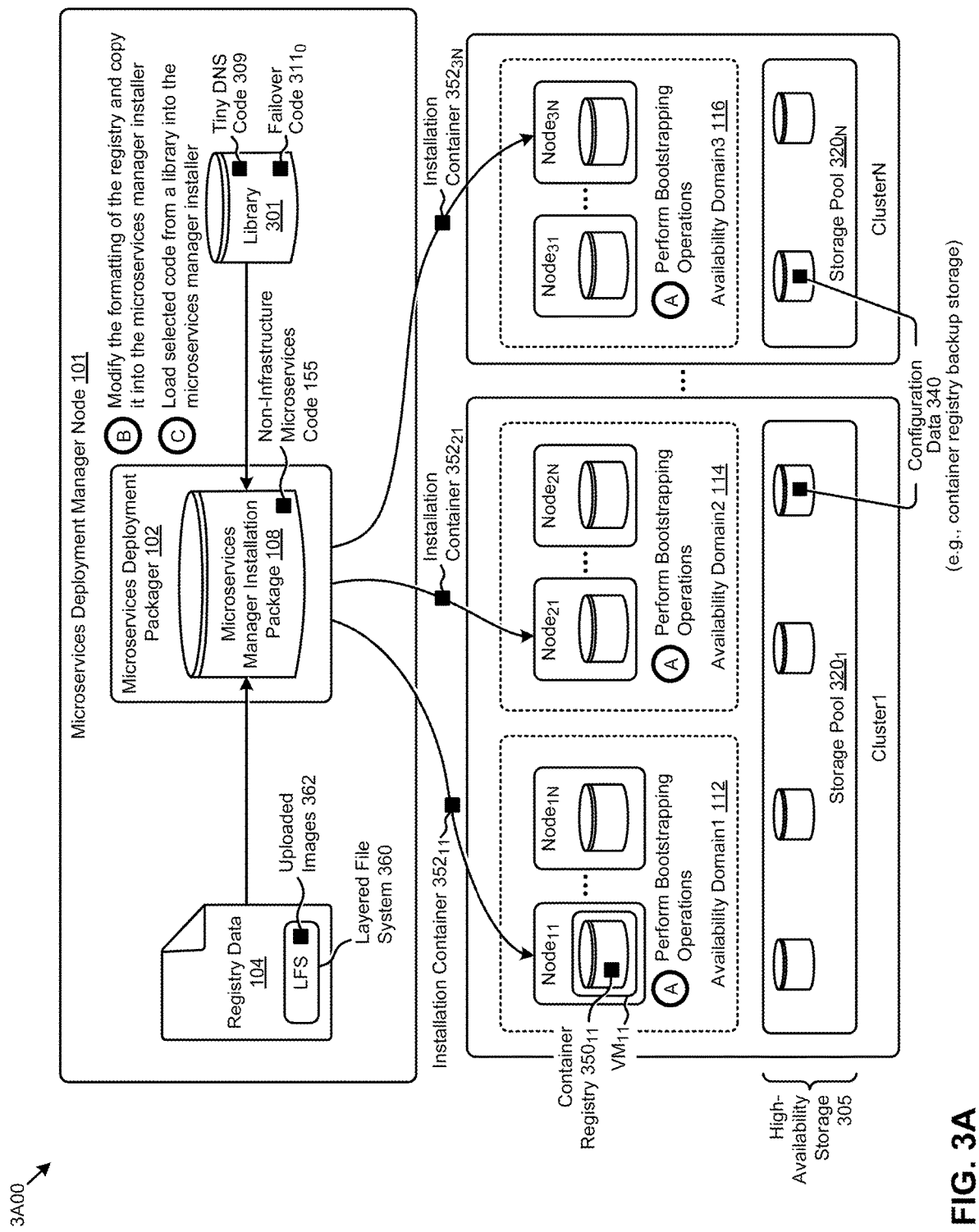
FIG. 3A shows a system that supports a containerized microservices registry in a highly available deployment configuration, according to an embodiment.

FIG. 3A shows a system 3A00 that supports a containerized microservices registry in a highly-available deployment configuration. As an option, one or more variations of system 3A00 or any aspect thereof may be implemented in the context of the architecture and functionality of the embodiments described herein. The system 3A00 or any aspect thereof may be implemented in any environment.

The figure is being presented to show variations in the configuration and usage of system 100 of FIG. 1. Specifically, system 3A00 includes high-availability storage 305. In the context of the herein-disclosed techniques for bootstrapping a containerized microservices registry this high-availability storage is used to provide redundant storage of the containerized microservices registry. This high-availability storage serves any/all of a plurality of computing nodes of a cluster. Any/all of a plurality of computing nodes of a cluster can extract (e.g., from an installer package) and invoke a containerized microservices registry in a bootstrapping process. A backing copy of a containerized microservices registry can be stored in high-availability storage, and any/all nodes of the cluster can access the high-availability storage.

As shown, high-availability storage 305 is composed of storage pools situated within respective clusters. The storage pools in turn are composed of a plurality of storage devices that are organized into a common, contiguous address space. More specifically, the individual address spaces of each of these storage devices are collected to form a storage pool having a common contiguous address space, which common contiguous address space is shared by the nodes of the cluster. In the event of a failure of a computing node, another computing node can take over without having to do any address translation before accessing the redundant storage of the containerized microservices registry. Further details pertaining to forming and using a storage pool are shown and described as pertains to FIG. 7B.

Further, the figure is being presented to show variations in the configuration and usage of system 100 of FIG. 1. Specifically, the figure is being presented to disclose techniques that pertain to formatting and configuring the registry data so as to comport with widely-used container technologies. As shown, the figure includes additional operations (e.g., operation B and operation C), which extend the capabilities beyond the capabilities of the heretofore-discussed FIG. 1.

The microservices deployment manager node 101 implements a microservices deployment packager 102. The packager in turn accesses registry data 104, which, as shown, is composed of a layered file system 360, which in turn is composed of any number of selected code images (e.g., images 362) that correspond to the microservices and/or selected data images (e.g., images 362) that correspond to resources needed by the microservices. Registry data that is deployed in an installation package may include such a layered file system such as the shown layered file system 360. As heretofore discussed, a container registry can be implemented in a layered file system that contains any number of executable containers that are configured such that each executable container is a READ/WRITE image having access to many read-only layers.

Additionally, when generating a microservices installer, the microservices deployment packager 102 accesses a library 301 composed of a tiny DNS code 309 (that implements a "tiny DNS" server) as well as failover code 311$_0$. The failover code is used by nodes that are situated in different availability zones. Deployment and uses of this failover code are shown and discussed as pertains to FIG. 6.

In this embodiment, when the microservices deployment packager 102 accesses the registry data, additional steps are carried out to comport with widely-used container technologies. Specifically, and as shown, the microservices deployment packager modifies the formatting of the registry before copying the registry data into a microservices manager installer (operation B). Further, the microservices deployment packager accesses library 301 to select certain code (e.g., tiny DNS code 309 and failover code 311$_0$) from the library for loading (operation C) into a containerized version of a microservices manager installer. Once this specialized microservices deployment packager 102 has been thusly configured, it is deployed as installation containers (e.g., installation container 352$_{11}$, installation container 352$_{21}$, . . . , installation container 352$_{3N}$) to selected cluster nodes. Upon receipt of a so-configured installation container, the receiving node runs the executable installation container to perform bootstrapping (operation A). In this embodiment, operation A encapsulates all or parts of the bootstrapping steps earlier discussed as pertains to performance of the heretofore-discussed operation 1, operation 2, operation 3, operation 4, operation 5 and operation 6.

As such, any node that receives a copy of a microservices installation container is able to bootstrap the microservice using the contents of the installer. Strictly as one example of a bootstrapping result, the bootstrapped microservice can access the registry through a tiny DNS server that is configured to provide node-local domain name services. Furthermore, once a microservice has been bootstrapped, it can access one or more high availability storage pools of the subject clusters in order to retrieve additional data and/or additional microservices, and/or any manner of computing environment configurations.

As shown, system 3A00 is further configured with high-availability storage 305. Such high-availability storage 305 may be implemented using physical storage devices that are organized into storage pools. In this particular embodiment, four physical storage devices comprise storage pool 320$_1$ while two physical storage devices comprise storage pool $320_N$. Each cluster (e.g., cluster1, . . . , clusterN) is associated with one storage pool. Such high-availability storage of any implementation, including high-availability storage pools, can persist as configuration data 340. In example embodiments, such configuration data 340 holds any configuration data (e.g., registry data, DNS data, etc.) for any node or plurality of nodes. In the example of FIG. 3A, configuration data 340 holds a highly-available copy of container registry $350_{11}$. Further, and as shown in the example of FIG. 3A, configuration data 340 holds persistent backing data for a virtual machine (e.g., $VM_{11}$). The virtual machine is configured to (1) access the container registry (e.g., from configuration data 340, or from any other storage location), and (2) provide container registry access to any operational elements (e.g., other VMs, applications, containers, operating system calls, etc.) that communicate with the VM. As used herein, a container registry is a data item that associates a microservice uniform resource location or indicator to an internet protocol (IP) address. In some embodiments as discussed herein, a container registry further contains compressed or uncompressed code that is addressed via a uniform resource location or indicator, and which code is entered at the IP address of the resource that corresponds to the uniform resource location or indicator.

Figure 3B:
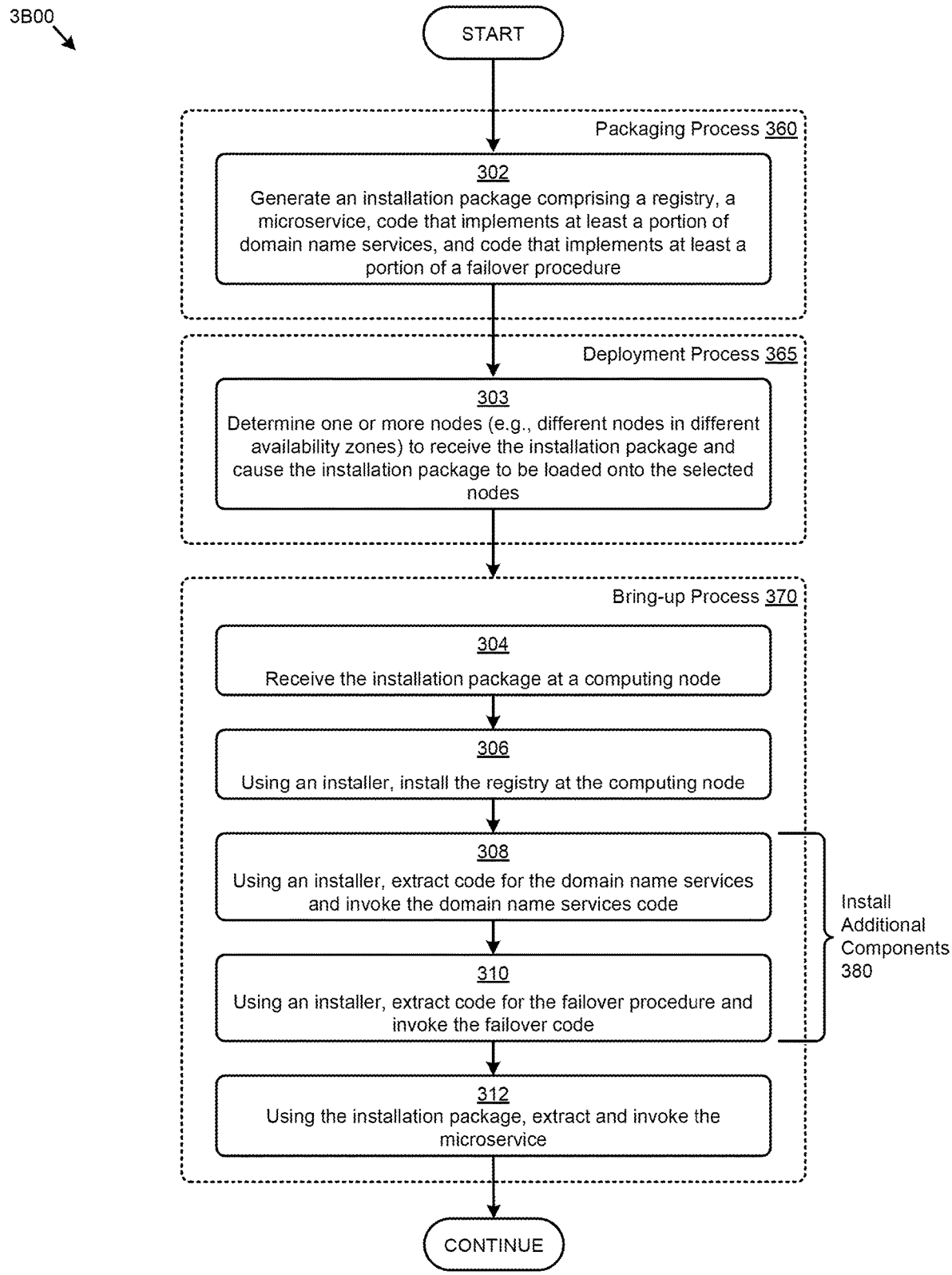
FIG. 3B presents a flow that shows steps for packaging and deploying an installation package, according to an embodiment.

FIG. 3B presents a flow 3B00 showing steps for packaging and deploying an installation package. As an option, one or more variations of flow 3B00 or any aspect thereof may be implemented in the context of the architecture and functionality of the embodiments described herein. The flow 3B00 or any aspect thereof may be implemented in any environment.

The figure is being presented to illustrate a possible sequencing of operations that accomplish generation of the installation package as well deployment of the generated installation package. Specifically, and as shown, the flow includes a packaging process 360, a deployment process 365, and a bring-up process 370. When the packaging process has been completed, an agent (e.g., a microservices deployment packager) can distribute the generated installation package to selected nodes. When the bring-up steps have been completed at a node (e.g., by one of the selected nodes), the node is able to run applications and/or run and/or serve any microservice that has been included in the generated installation package. The foregoing processes of FIG. 3B are now discussed.

The packaging process includes a step 302 that generates an installation package. At least inasmuch as a target node to which the installation package is provided needs to run a microservice that is accessed by a registry that is served from a particular IP address, packaging process 360 generates an installation package that comprises a registry, a microservice, and code that implements at least a portion of domain name services. In situations where high-availability is to be implemented, the installation package may also include failover code (e.g., failover code $311_0$ of FIG. 3A). After the installation package has been generated, the installation package is deployed to one or more selected nodes (e.g., different nodes in different availability zones). The deployment actions (e.g., step 303) cause the installation package to be loaded onto the selected nodes. In some cases, a particular target node includes a running host operating system. In such cases, facilities of the host operating system can be used to cause the installation package to be loaded onto the memory space of the particular target node. In other situations, facilities of the basic I/O (input/output or IO) system (BIOS) can be used to cause the installation package to be loaded onto the memory space of the particular target node.

Continuing with discussion of the flow of FIG. 3B, the bring-up process 370 includes several steps, some of which are optional depending on the configuration of the cluster. The particular sequence of bring-up process 370 begins when the installation package is received at a node (step 304). In example embodiments, the installation package is a self-extracting executable. That is, in example embodiments, the installation package can be executed and, in doing so, it can (1) self-extract code and/or data and/or scripts from the installation package, and (2) further execute extracted code and/or extracted scripts. As such, the bring-up process can execute extracted code and/or extracted scripts to install a node-local registry on the node (step 306). In some embodiments and/or in some configurations, the installation package is configured with additional installers that are in turn configured to be able to extract and install additional components 380.

Strictly as an example, the installation package might be configured with additional installers that are configured to extract code for domain name services, configure the domain name services, and invoke the domain name services (step 308). Strictly as a further example, the installation package might be configured with additional installers that are configured to extract code that implements a failover protocol (step 310). Still further, and strictly as an example, the installation package might be configured with additional installers that are configured to extract portions of configuration data that is used when carrying out the aforementioned failover protocol. For example, certain portions of the configuration data might specify an initial leader/follower relationship between the subject node and another node.

When the registry has been extracted and configured, and a corresponding entry has been made in the node-local domain name service data structures, a microservice included in the installation package is extracted and invoked (step 312). The extracted and invoked microservice may carry out additional extractions and/or invocations and/or additional configuration steps. Furthermore, the subject node may carry out further steps (e.g., by operation of step 312 or by operation of any aspect of the deployment process 370). As such, and now having needed the infrastructure microservices installed, the flow may continue as shown. The node might be used to run applications and/or might be used to run and/or host additional microservices, etc.

The foregoing discussion of FIG. 3A and FIG. 3B is illustrative of merely one embodiment. Many other embodiments are possible, some of which use particular data structures and/or standards so as to provide consonance with any range of widely-used container technologies when used to implement a high-performance, highly available microservices platform. More particularly, specific implementations of step 302, step 304, step 306, and step 308 are shown and discussed as pertains to FIG. 4.

Figure 4:
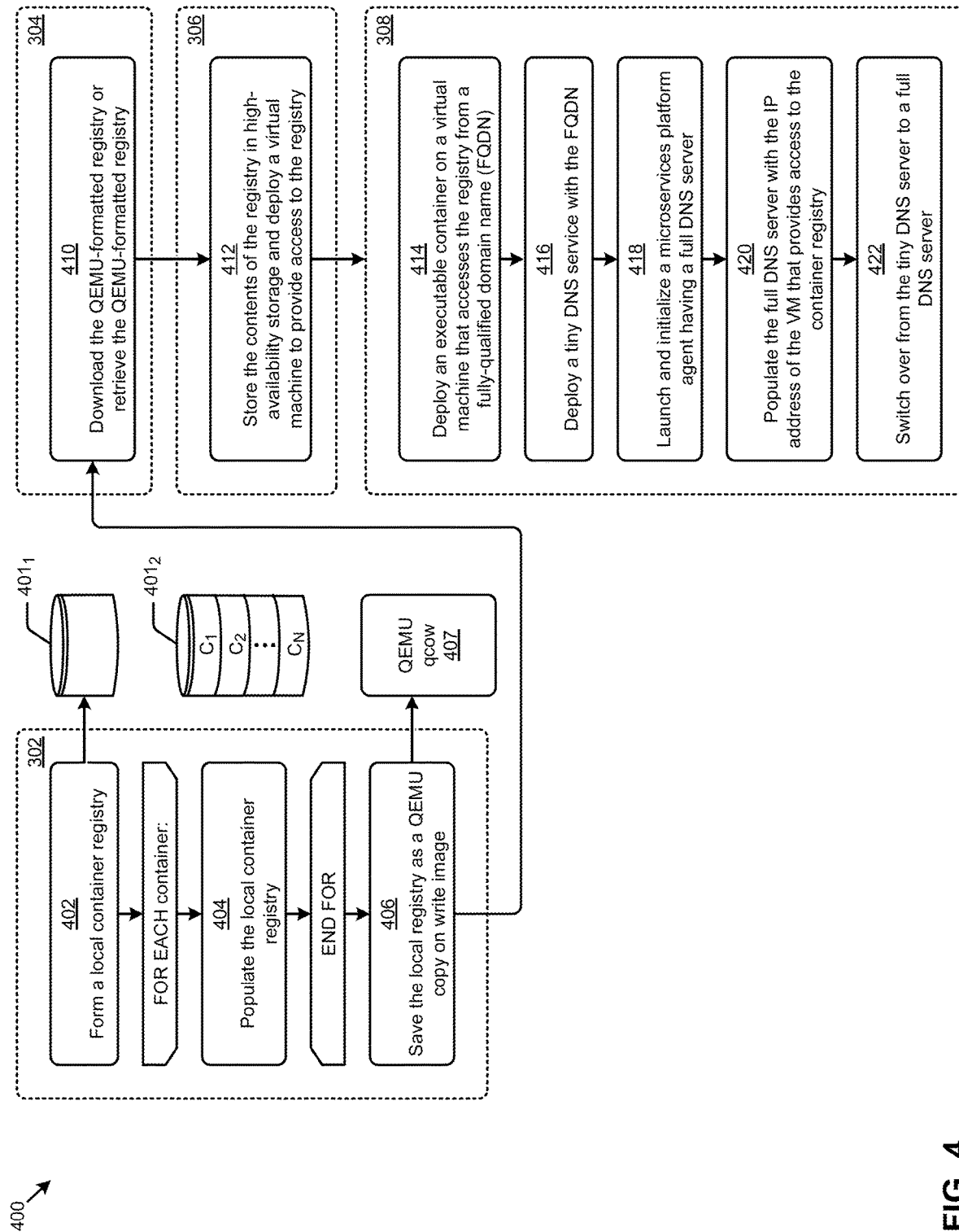
FIG. 4 presents a flow showing steps for packaging and deploying a high-performance, highly available microservices container registry in a microservices platform, according to an embodiment.

FIG. 4 presents a flow 400 showing steps for packaging and deploying a high-performance, highly available microservices container registry in a microservices platform. As an option, one or more variations of flow 400 or any aspect thereof may be implemented in the context of the architecture and functionality of the embodiments described herein. The flow 400 or any aspect thereof may be implemented in any environment.

The figure is being presented to show how a high-performance, highly available container registry can be deployed. Specifically, the figure shows how a registry can be populated using a high-performance layered file system. Still more specifically, components of a container registry can be populated into a layered file system that formats its contents into a QEMU copy-on-write (qcow) image. This registry qcow consists of all the containers required by the platform to bootstrap on a node. The contents of such a registry qcow can be determined at a microservices deployment manager node, and the determined contents (e.g., microservices containers) can be populated into a registry qcow before being deployed. An example approach for a QEMU copy-on-write (qcow) image is shown by the sequence of operations from step 402, step 404, and step 406.

In this embodiment, an agent of the microservices deployment manager node (e.g., microservices deployment packager 102) forms a local container registry (step 402), which local container registry is populated with a set of microservices that are intended for deployment. The determination and/or selection of microservices that are intended for deployment can be accomplished by any known technique. Once the set of microservices that are intended for deployment on a particular node have been determined (step 402) an entry for each can be made into a microservices container registry (e.g., the shown local container registry $401_1$). Then, for each entry, the local container registry can be populated with a containerized version of the set of microservices that are intended for deployment. The populated local container registry $401_2$ can be formatted into a QEMU qcow image 407, saved in an externally-accessible location (step 406) and posted for download and/or stored in a persistent storage location. Strictly as examples, the posted registry can be persistently stored in one or more storage pools, and/or the posted registry can be persistently stored for download access at a microservices deployment manager node, and/or the posted registry can be stored at any location accessible to the node or nodes that are intended to be configured with the set of microservices.

As such, any node that is intended to configure infrastructure microservices and/or any other microservices that are included in the set of microservices can download the QEMU copy-on-write (qcow) image. Further steps (e.g., step 410 through step 422) that can be carried out over the QEMU copy-on-write (qcow) image are now briefly discussed.

A target node can download or otherwise access the QEMU qcow 407 (step 410). In some cases, the target node autonomously stores the QEMU qcow in a location and format that facilitates access by a virtual machine (step 414) which in turn is configured to provide access to the registry by other virtual machines and/or other operational elements (e.g., applications, containers, operating system calls, etc.). The node is thusly configured to be able to host the registered microservices; however, in some cases the node has not yet been configured with a DNS server. Moreover, in some cases, the node has not yet been configured with the infrastructure microservices and, as such, might not have sufficient DNS infrastructure in place to handle domain name service translation/routing from a FQDN of a microservice to its corresponding IP address. In such cases, a "tiny" DNS server is deployed (step 416) using code that had been extracted from the installation package. Once such a tiny DNS server is able to route microservice calls to a designated address at its own node-local IP address, further calls can be made to other microservices.

Strictly as one illustrative example, an executable container (e.g., a bootstrapping agent) can be used to launch and initialize a full microservices platform having a full DNS server (step 418). This full DNS server can then be populated (step 420) with the location of the container registry that was downloaded in step 412. Alternatively, this full DNS server can then be populated with the IP address of the virtual machine that was configured in step 412. At this point, the node has been sufficiently bootstrapped to be able to use the aforementioned full DNS server. Step 422 causes a switchover from the tiny DNS server to the full DNS server.

Figure 5A:
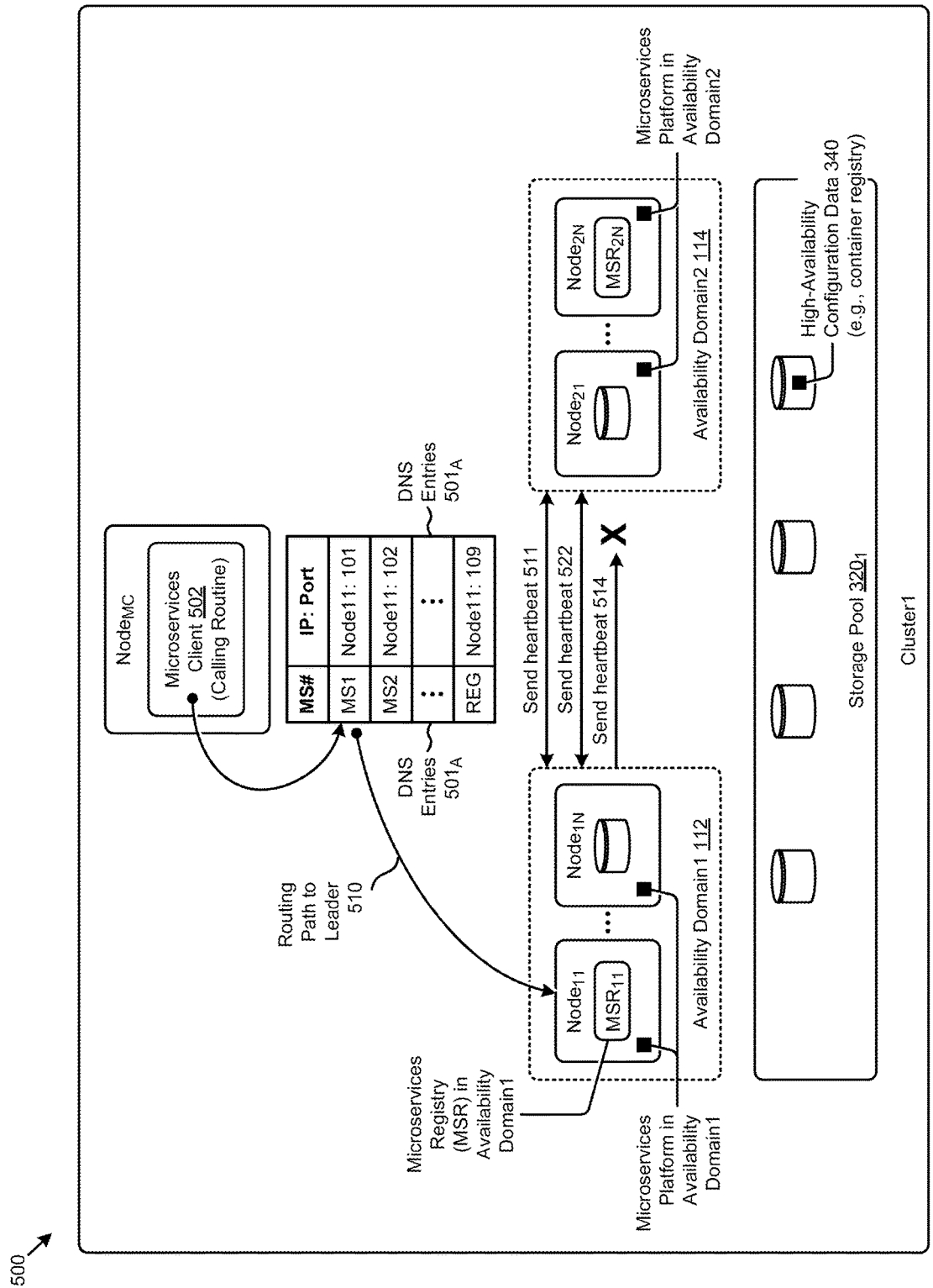
FIG. 5A and FIG. 5B depict an illustrative sequence in a system to show a sequence of operations to implement a highly available microservices container registry by using availability zone monitoring and failover, according to an embodiment.
Figure 5B:
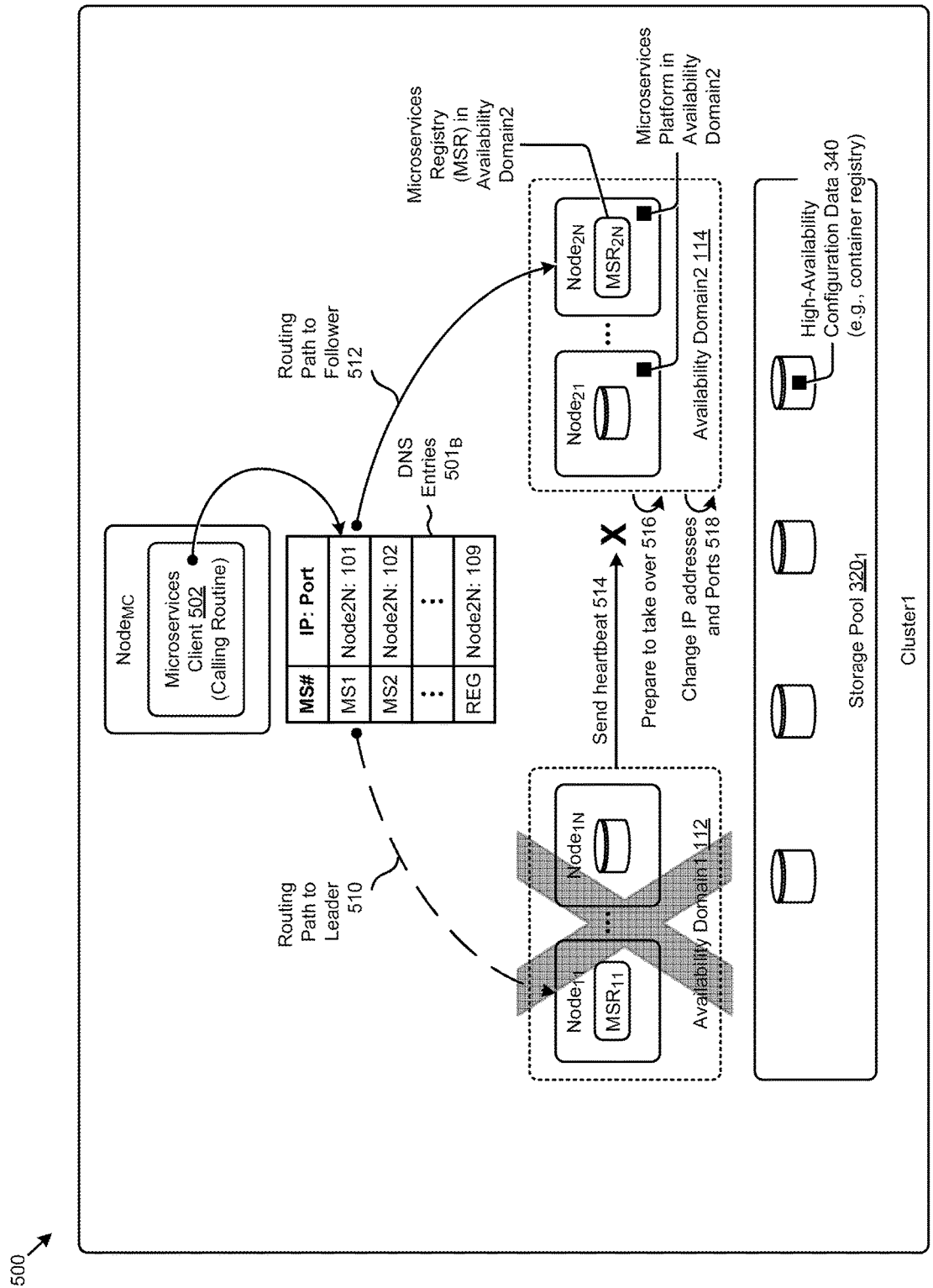

FIG. 5A and FIG. 5B depict an illustrative sequence in a system 500 to show a sequence of operations to implement a highly available microservices container registry by using availability zone monitoring and failover. As an option, one or more variations of system 500 or any aspect thereof may be implemented in the context of the architecture and functionality of the embodiments described herein. The system 500 or any aspect thereof may be implemented in any environment.

The illustrative sequence of FIG. 5A and FIG. 5B is being presented to illustrate one way to implement a highly available microservices container registry, which may or may not be a part of a highly available microservices platform. As previously discussed, a microservices platform might include support libraries, configuration data, rules and/or protocols. Additionally, components of a microservices platform may include code for initialization of, and operation in, a high-availability mode involving leader/follower nodes that are situated within different availability zones. As such, callers to a node that hosts microservices can be assured that even if a failure event were to occur that impacts online availability of a first microservices platform, a failover node will bring a second microservices platform online, which in turn can service microservice callers.

To accomplish this, and in accordance with the embodiment of system 500, a first instance of a microservices platform is situated into availability domain1 and a second instance of a microservices platform is situated into availability domain2. Similarly, a first instance of a microservices registry is situated into availability domain1 and a second instance of a microservices platform is situated into availability domain2. As such, should some event occur that would cause the host node in availability domain1 to fail to compute, or should some event occur that would cause the host node in availability domain1 to fail to communicate, a host node in availability domain2 can begin to provide services of a microservices platform and/or services of a microservices registry.

In one embodiment, and to accomplish this aspect of high availability, a host node in availability domain1 coordinates with a host node in availability domain2. Specifically, components shown in FIG. 5A coordinate with each other so as to carry out steps for establishing a high-availability leader/follower relationship between two nodes, each of which are configured to host a microservices platform and a microservices registry (MSR). FIG. 5B depicts additional steps taken when communication between the established leader and the established follower is interrupted (e.g., a failure of some sort has occurred). The environment of FIG. 5B is substantially the same as the environment of FIG. 5A, however FIG. 5A shows a first set of DNS entries $501_A$ and FIG. 5B shows a second set of DNS entries $501_B$.

In this environment a client (e.g., microservices client 502) from any location (e.g., from the shown node labeled Node$_{MC}$) invokes a routine that calls a microservice (e.g., MS1, MS2, . . . ). The called microservice is called by an associated FQDN, which then translates the FQDN into an IP address and port of the called microservice. In this manner, the physical location (i.e., IP address and port) of the called microservice can be handled independently from the FQDN. Once the FQDN of the called microservice is translated into a corresponding IP address and port, the call is routed to the corresponding IP address and port where the microservice is executed in accordance with any microservice parameters. In the shown configuration where the leader is $Node_{11}$ of availability domain1 112, the routing path to leader 510 is taken, and $Node_{11}$ of availability domain1 112 handles the microservice call using microservices registry $MSR_{11}$.

High availability is facilitated by assigning a failover follower node that is in network communication with the leader node. The leader node and follower node each execute a protocol where a heartbeat signal is exchanged on a periodic basis. As shown by message 511, $node_{11}$ sends a heartbeat signal (e.g., a network packet) to $node_{21}$. Similarly, and as shown by message 522, $node_{21}$ sends a heartbeat signal (e.g., a network packet) to $node_{11}$. If it happens that a heartbeat signal is not received within a set amount of time, then the node that did not receive the heartbeat signal will modify the DNS entries such that microservice calls can be routed to a node that is deemed to be operational.

One specific case of this is illustrated in the illustrative sequence of FIG. 5A and FIG. 5B. Specifically, FIG. 5A shows that the leader (e.g., $node_{11}$) sends a heartbeat to the follower (e.g., $node_{12}$) via message 514; however, that message is never received by the follower. FIG. 5B, shows that the leader is 'down', or at least unreachable by the follower. Then, based on the missed heartbeat, the follower deems that the leader is no longer operational, and prepares to take over the high availability provision of the microservices (operation 516). Preparations to take over may include identifying the then-current DNS server that had been designated to translate FQDNs of microservices into IP addresses. Preparations to take over may further include advising remediation services of the supposed downing of the leader node. Preparations to take over may further include retrieving the then-current list of microservices (e.g., by retrieval of configuration data 340 of storage pool $320_1$ at cluster1) that had been assigned to the leader node.

After preparing to take over the high-availability provision of the microservices, the follower accesses the determined DNS server and changes the IP addresses and ports to refer to itself (step 518). Thereafter, when a microservices client calls a microservice via the microservice's FQDN, the DNS server routes the call via the routing path to follower 512.

In high-availability scenarios, and responsive to a loss of communication between the leader node and the follower node, the follower node changes entries in the DNS server that is serving the cluster. Changes to the DNS server record (e.g., changes to the IP and port for the microservices container registry, as shown in DNS entries $501_B$) serve to refer to a node-local IP address of the microservices container registry at the follower node (e.g., $Node_{2N}$, as shown). Inasmuch as any of the microservices (e.g., MS1, MS2, etc.) are hosted at the follower node, a corresponding DNS entry for those microservices are changed as well to refer to node-local IP address of the microservices that are hosted at the follower node (e.g., $Node_{2N}$, as shown).

Portions of the foregoing process can be reversed to revert leadership back to the former leader node $node_{11}$. Alternatively, a new leader node can be elected and, once elected and operational, its IP address can be used to update the IP addresses that correspond to a FQDN.

Further details regarding general approaches to selecting leader nodes are described in U.S. patent application Ser. No. 15/160,347 titled "SCALABLE LEADERSHIP ELECTION IN A MULTI-PROCESSING COMPUTING ENVIRONMENT", filed on May 20, 2016, which is hereby incorporated by reference in its entirety.

Figure 6:
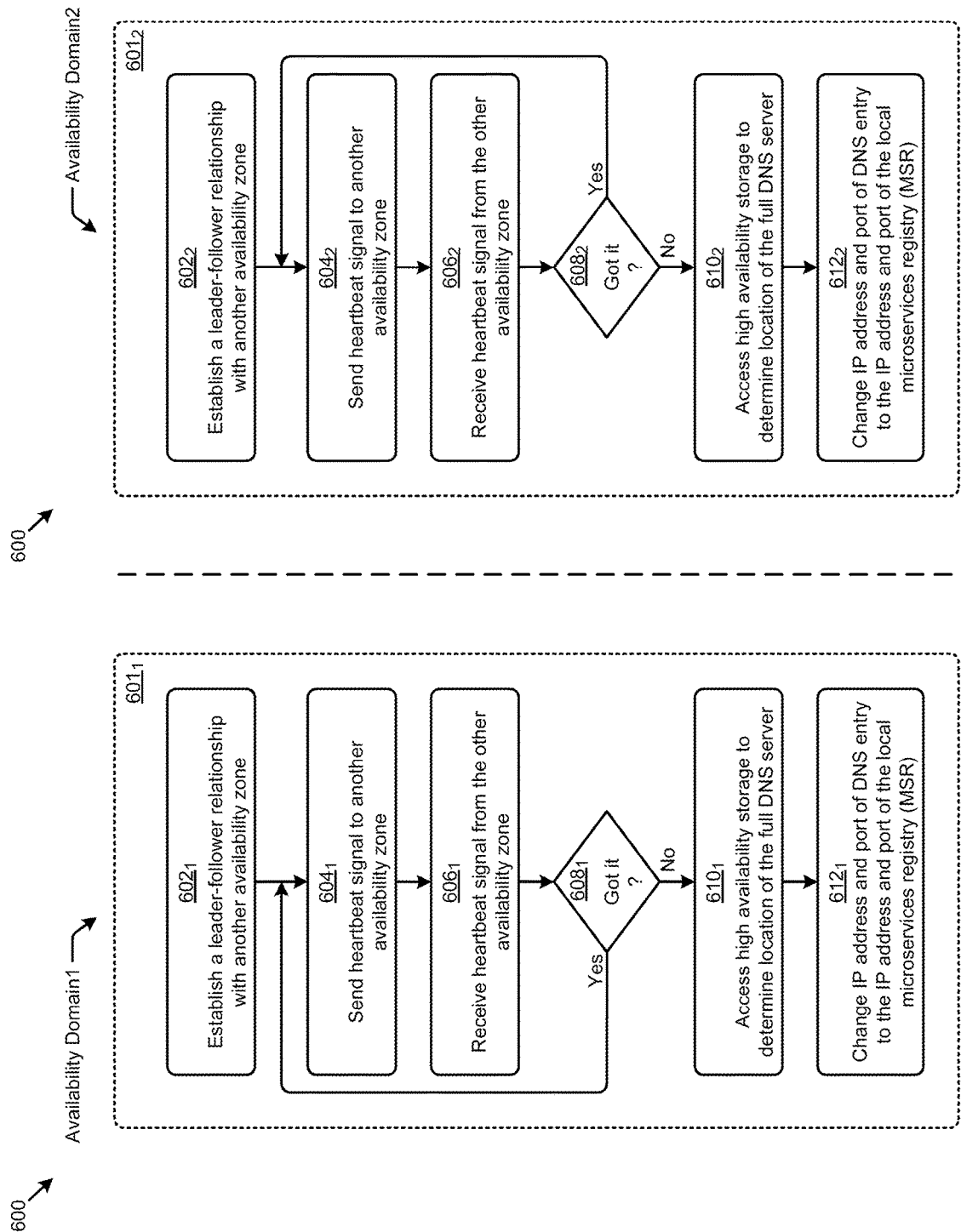
FIG. 6 shows operations to implement availability zone monitoring and failover, according to an embodiment.

FIG. 6 shows operations 600 to implement availability zone monitoring and failover. As an option, one or more variations of the operations 600 or any aspect thereof may be implemented in the context of the architecture and functionality of the embodiments described herein. The operations 600 or any aspect thereof may be carried-out in any environment.

As shown, flow $601_1$ and flow $601_2$ operate in availability domain1 and availability domain2, respectively. The two flows, flow $601_1$ and flow $601_2$, execute independently from each other. This series of operations 600 is being presented here to describe one embodiment of monitoring and failover that occurs between a leader and a corresponding follower. The leader and the follower may be designated in other steps (not shown).

Moreover, an intended relationship between a designated leader and a designated follower may be stored in persistent storage such that when a node (e.g., a designated leader node) in, for instance, availability domain1 executes step $602_1$, it attempts to establish a leader/follower relationship with a node in another availability domain. Concurrently, when a node (e.g., a designated follower node) in availability domain2 executes step $602_2$, it attempts to establish a follower/leader relationship with a node in the other availability domain. Once the leader/follower and follower/leader relationship has been established, both nodes send periodic heartbeat signals to each other (e.g., at step $604_1$ and step $604_2$), which heartbeat signals are received (e.g., at step $606_1$ and step $606_2$) and processed. If either node does not receive a heartbeat signal from the other node within a certain amount of time, the "No" branch of the decision (e.g., decision $608_1$ and decision $608_2$) is taken and preparations for takeover are initiated (e.g., at step $610_1$ and step $610_2$). Otherwise, if a heartbeat signal from the other node is received within a certain amount of time, then the "Yes" branch of the decision (e.g., decision $608_1$ and decision $608_2$) is taken and heartbeat signaling continues.

In some cases, a leader node that is deemed to be down by its associated follower might actually not be down, but rather might be merely disconnected from the network. In such a case, an attempt to access high availability storage to determine the location of a full DNS server (e.g., at step $610_1$ and step $610_2$) might fail for one of the nodes. Similarly, an attempt by that node to change the IP addresses and port addresses of entries in the full DNS server (e.g., at step $612_1$ and step $612_2$) would, for the same reasons, also fail. Accordingly, one node will either take over leadership or retain leadership. In the latter case, the node that retains leadership when an associated follower goes down also advises any remediation services of the supposed downing of its associated follower.

In some embodiments, a floating IP address is used to support takeover in a high-availability setting, such as in a high-availability computing cluster. In such settings, the cluster is configured such a way that a designated leader of the cluster owns (e.g., responds to) a particular floating IP address at any given time. Should the designated leader fail or be deemed to have failed by a corresponding follower, then ownership of the floating IP address would be transferred to the follower member, and the follower member then becomes the new leader. In example embodiments, the new leader issues a gratuitous address resolution protocol (ARP) packet to announce the new MAC address to IP address association.

Additional Embodiments of the Disclosure

Additional Practical Application Examples

Figure 7A:
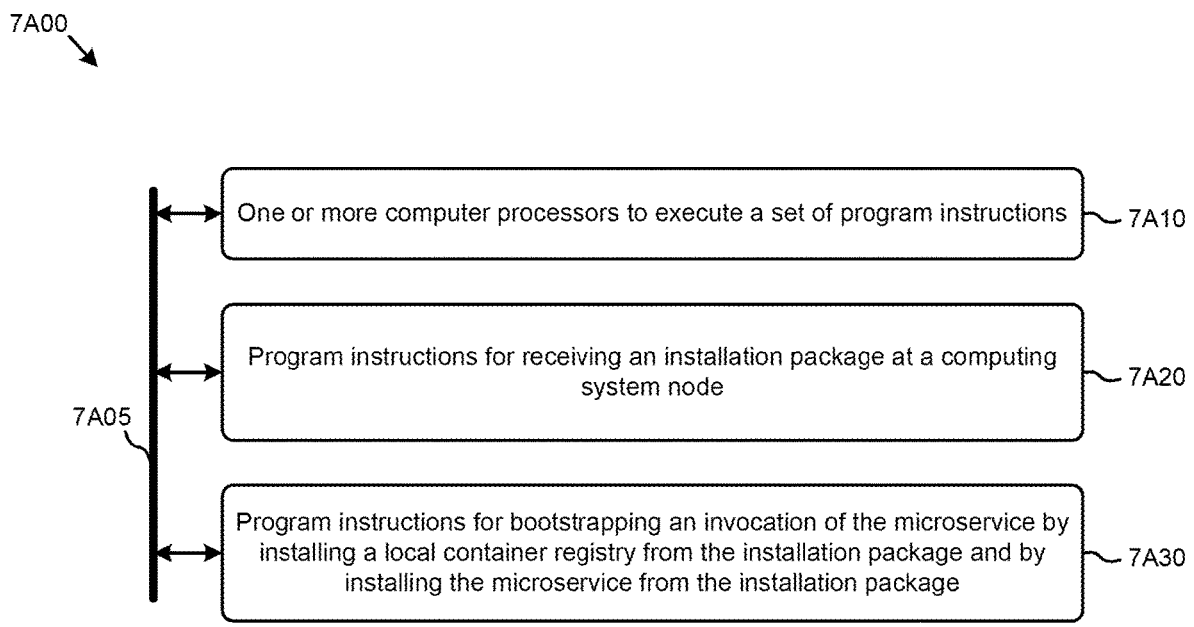
FIG. 7A depicts a system as an arrangement of computing modules that are interconnected so as to operate cooperatively, according to an embodiment.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes bootstrapping a microservices registry. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment. The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims. The shown embodiment implements a portion of a computer system, presented as system 7A00, comprising one or more computer processors to execute a set of program code instructions (module 7A10) and modules for accessing memory to hold program code instructions to perform: receiving an installation package at a computing system node (module 7A20); and bootstrapping an invocation of the microservice by installing a local container registry from the installation package and by installing the microservice from the installation package (module 7A30).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 7B:
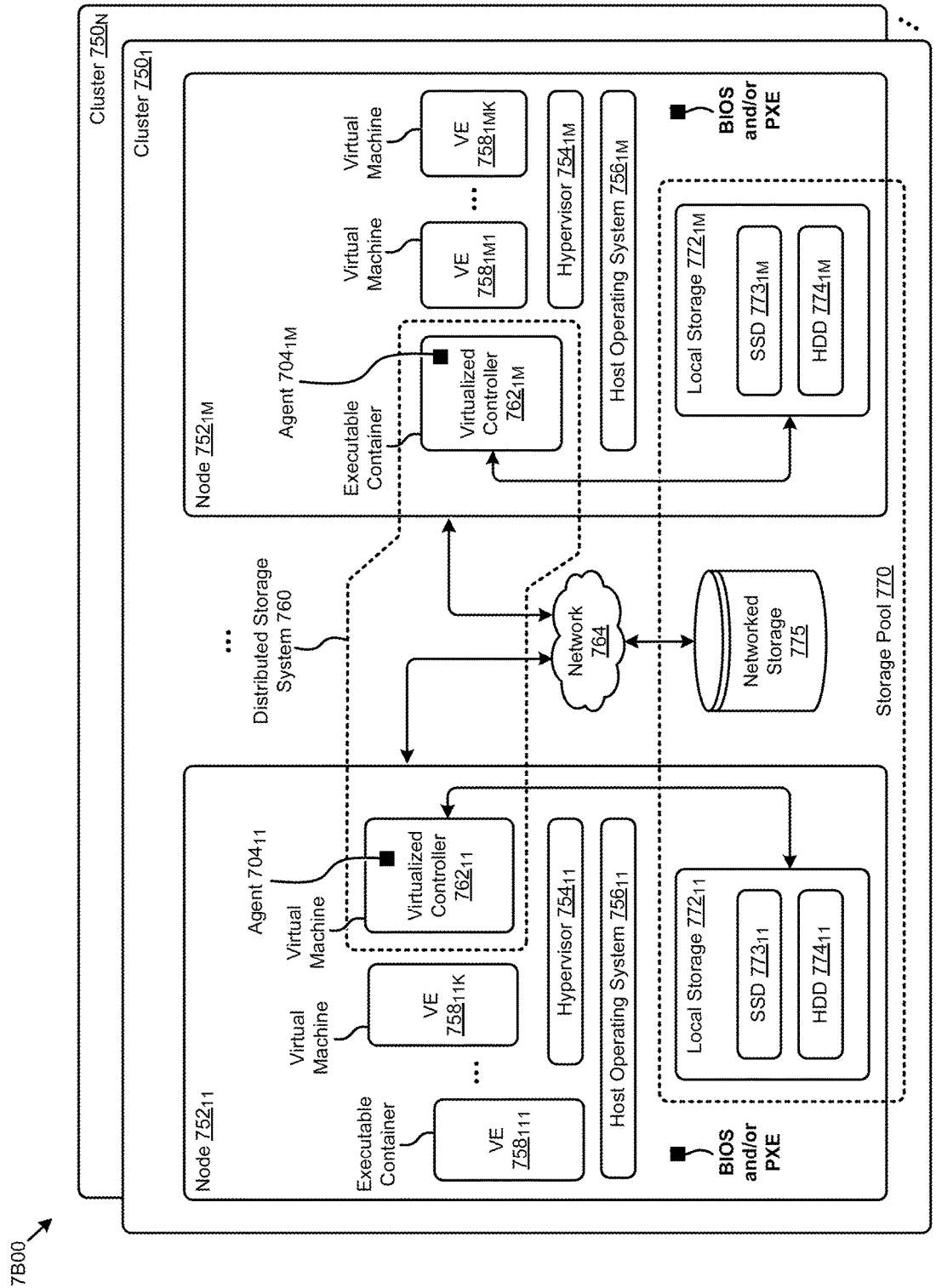
FIG. 7B depicts a virtualization environment composed of various components associated with instances of distributed virtualization systems, according to an embodiment.

FIG. 7B depicts a virtualization environment composed of various components associated with instances of distributed virtualization systems (e.g., hyperconverged distributed systems) that can be used to implement the herein disclosed techniques. Specifically, the distributed virtualization environment 7B00 comprises multiple clusters (e.g., cluster $750_1, \ldots,$ cluster $750_N$) comprising multiple nodes that have multiple tiers of storage in a storage pool. Representative computing nodes (e.g., node $752_{11}, \ldots,$ node $752_{1M}$) and storage pool 770 associated with cluster $750_1$ are shown. Each computing node can be associated with one server, multiple servers, or portions of a server. The nodes can be associated (e.g., logically and/or physically) with the clusters. As shown, the multiple tiers of storage include storage that is accessible through a network 764, such as a networked storage 775 (e.g., a storage area network or SAN, network attached storage or NAS, etc.). The multiple tiers of storage further include instances of local storage (e.g., local storage $772_{11}, \ldots,$ local storage $772_{1M}$). For example, the local storage can be within or directly attached to a server and/or appliance associated with the nodes. Such local storage can include solid state drives (SSD $773_{11}, \ldots,$ SSD $773_{1M}$), hard disk drives (HDD $774_{11}, \ldots,$ HDD $774_{1M}$), and/or other storage devices.

As shown, any of the nodes of the distributed virtualization environment 7B00 can implement one or more user virtualized entities (e.g., VE $758_{111}, \ldots,$ VE $758_{11K}, \ldots,$ VE $758_{1M1}, \ldots,$ VE $758_{1MK}$), such as virtual machines (VMs) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $756_{11}, \ldots,$ host operating system $756_{1M}$), while the VMs run multiple applications on various respective guest operating systems. Such flexibility can be facilitated at least in part by a hypervisor (e.g., hypervisor $754_{11}, \ldots,$ hypervisor $754_{1M}$), which hypervisor is logically located between the various guest operating systems of the VMs and the host operating system of the physical infrastructure (e.g., node).

In the context of the herein-disclosed embodiments, for bring-up of infrastructure microservices onto a computing node, a VM can be configured to (1) access the container registry (e.g., from high-availability configuration data 340, or from any other storage location), and (2) provide container registry access to any operational elements (e.g., other VMs, applications, containers, operating system calls, etc.) that communicate with the VM.

In example cases, such as heretofore-described, executable containers may be implemented at the nodes. The executable containers comprise groups of processes and/or resources (e.g., memory, CPU, disk, etc.) that are isolated from the node host computer and other containers. In some cases, such executable containers directly interface with the kernel of the host operating system (e.g., host operating system $756_{11}, \ldots,$ host operating system $756_{1M}$) without reliance on a hypervisor layer. This lightweight implementation can facilitate efficient distribution of certain software components, such as applications or services (e.g., infrastructure and non-infrastructure microservices). Any node of a distributed virtualization environment 7B00 can implement both a hypervisor-assisted virtualization environment and a container virtualization environment for various purposes. Also, any node in a distributed virtualization environment can implement a virtualized controller to facilitate access to storage pool 770 by the VMs and/or the executable containers.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor).

Multiple instances of such virtualized controllers can coordinate within a cluster to form the distributed storage system 760 which can, among other operations, manage the storage pool 770. This architecture further facilitates efficient scaling in multiple dimensions (e.g., in a dimension of computing power, in a dimension of storage space, in a dimension of network bandwidth, etc.).

The foregoing virtualized controllers can be implemented in the distributed virtualization environment using various techniques. As one specific example, an instance of a virtual machine at a given node can be used as a virtualized controller in a hypervisor-assisted virtualization environment to manage storage and I/O activities. In this case, for example, the virtualized entities at node $752_{11}$ can interface with a controller virtual machine (e.g., virtualized controller $762_{11}$) through hypervisor $754_{11}$ to access storage pool 770. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 760. For example, a hypervisor at one node in the distributed storage system 760 might correspond to software from a first vendor, and a hypervisor at another node in the distributed storage system 760 might correspond to a second software vendor. As another virtualized controller implementation example, executable containers can be used to implement a virtualized controller (e.g., virtualized controller $762_{1M}$) in an operating system virtualization environment at a given node. In this case, for example, the virtualized entities at node $752_{1M}$ can access the storage pool 770 by interfacing with a controller container (e.g., virtualized controller $762_{1M}$) through hypervisor $754_{1M}$ and/or the kernel of host operating system $756_{1M}$.

In certain embodiments, one or more instances of an agent can be implemented in the distributed storage system 760 to facilitate any operations within the virtualization environment. Specifically, agent $704_{11}$ can be implemented in the virtualized controller $762_{11}$, and agent $704_{1M}$ can be implemented in the virtualized controller $762_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents. Any portions of any of the operational elements in the environment of FIG. 7B can be loaded onto the node using a BIOS or by using PXE. Any/all elements of FIG. 7B can be pre-configured into an installation package. Moreover, a virtualized controller and/or any other component of FIG. 7B can be brought-up into an operational state by executing all or portions of an installation package.

System Architecture Overview

Additional System Architecture Examples

Figure 8A:
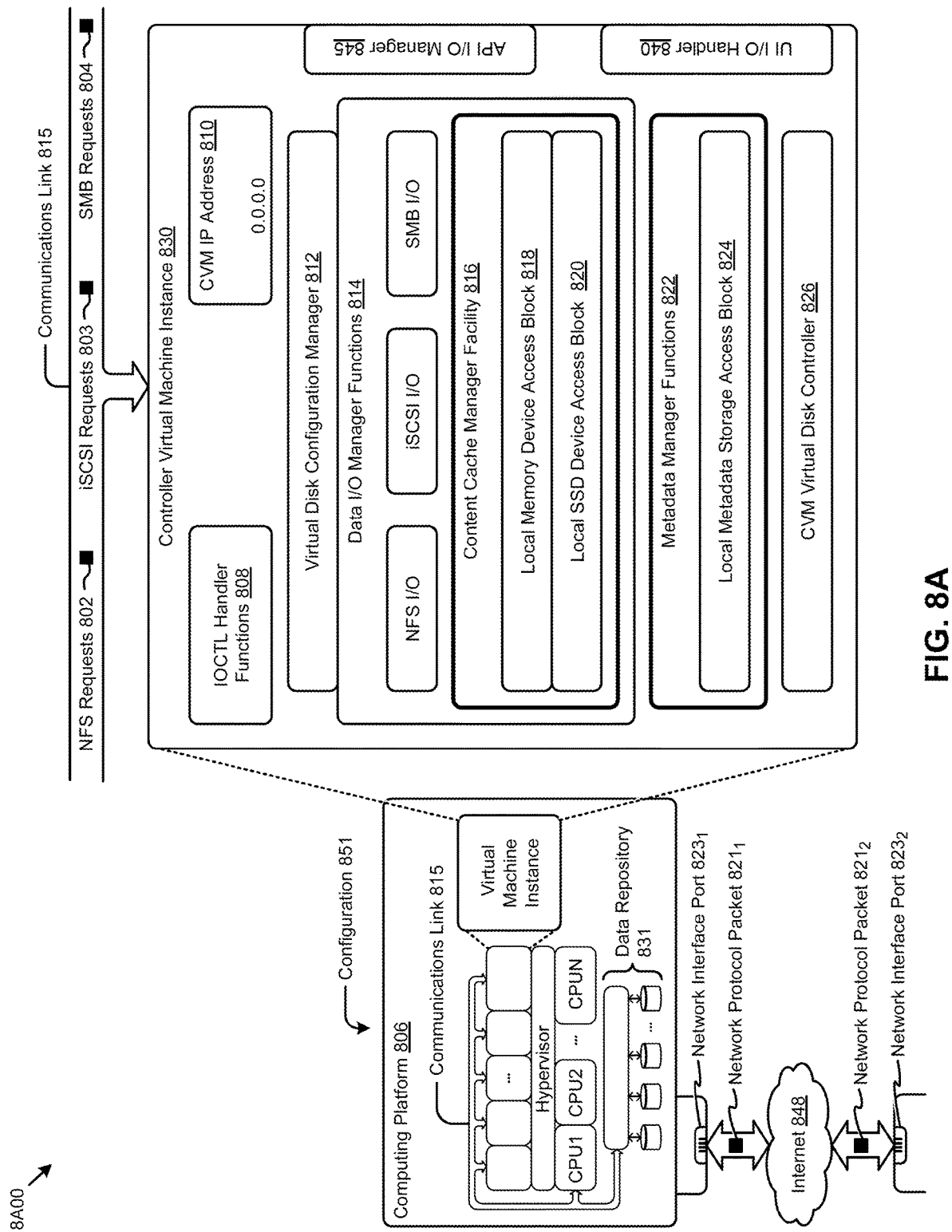
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 82 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to deploying a highly available container registry in a microservices platform. In some embodiments, a module may include one or more state machines and/or combinational logic used to implement or facilitate the operational and/or performance characteristics pertaining to deploying a highly available container registry in a microservices platform.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of deploying a highly available container registry in a microservices platform). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to deploying a highly available container registry in a microservices platform, and/or for improving the way data is manipulated when performing computerized operations pertaining to deploy a specially-constructed microservice registry into a node image before instancing the image to a node.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
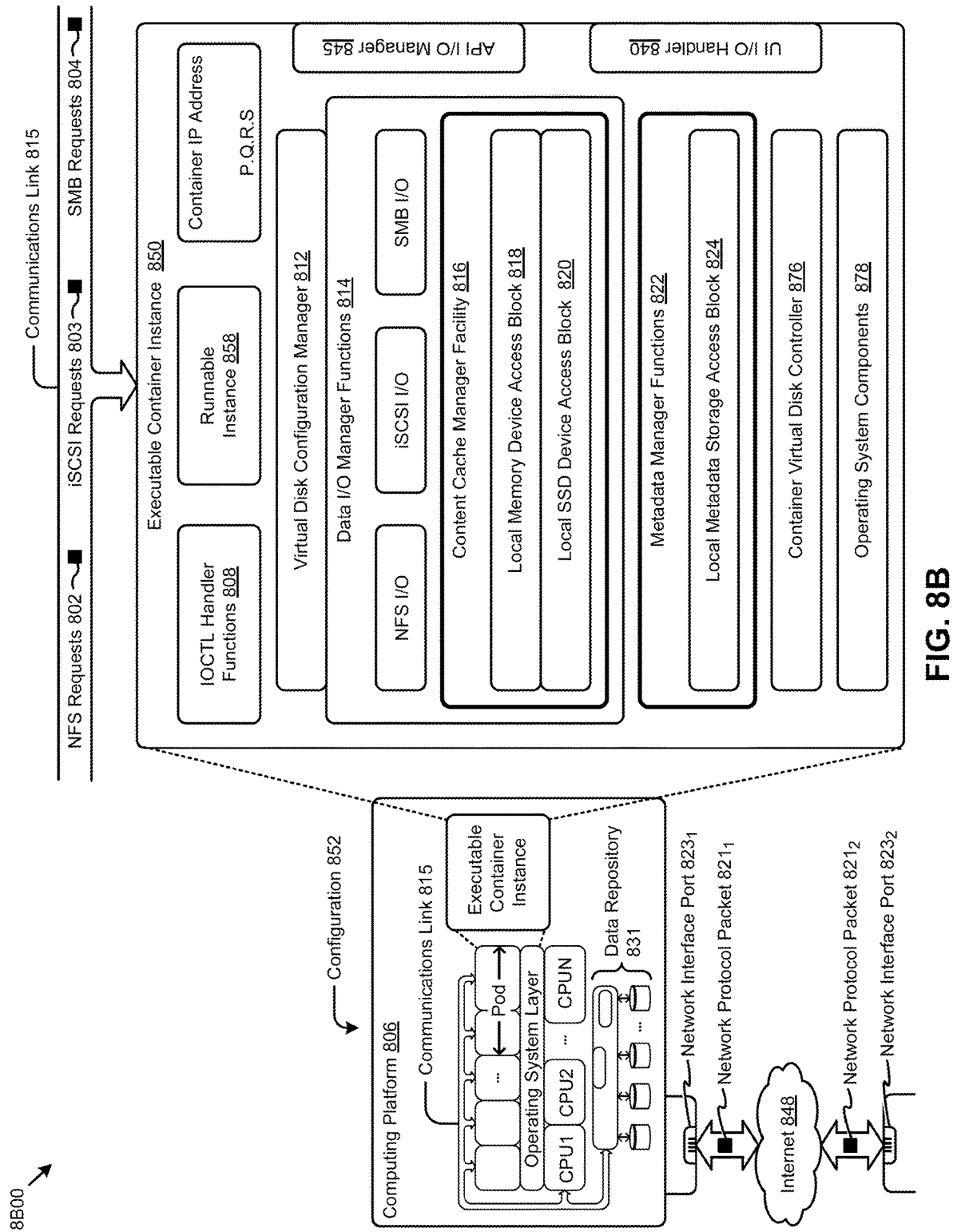

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
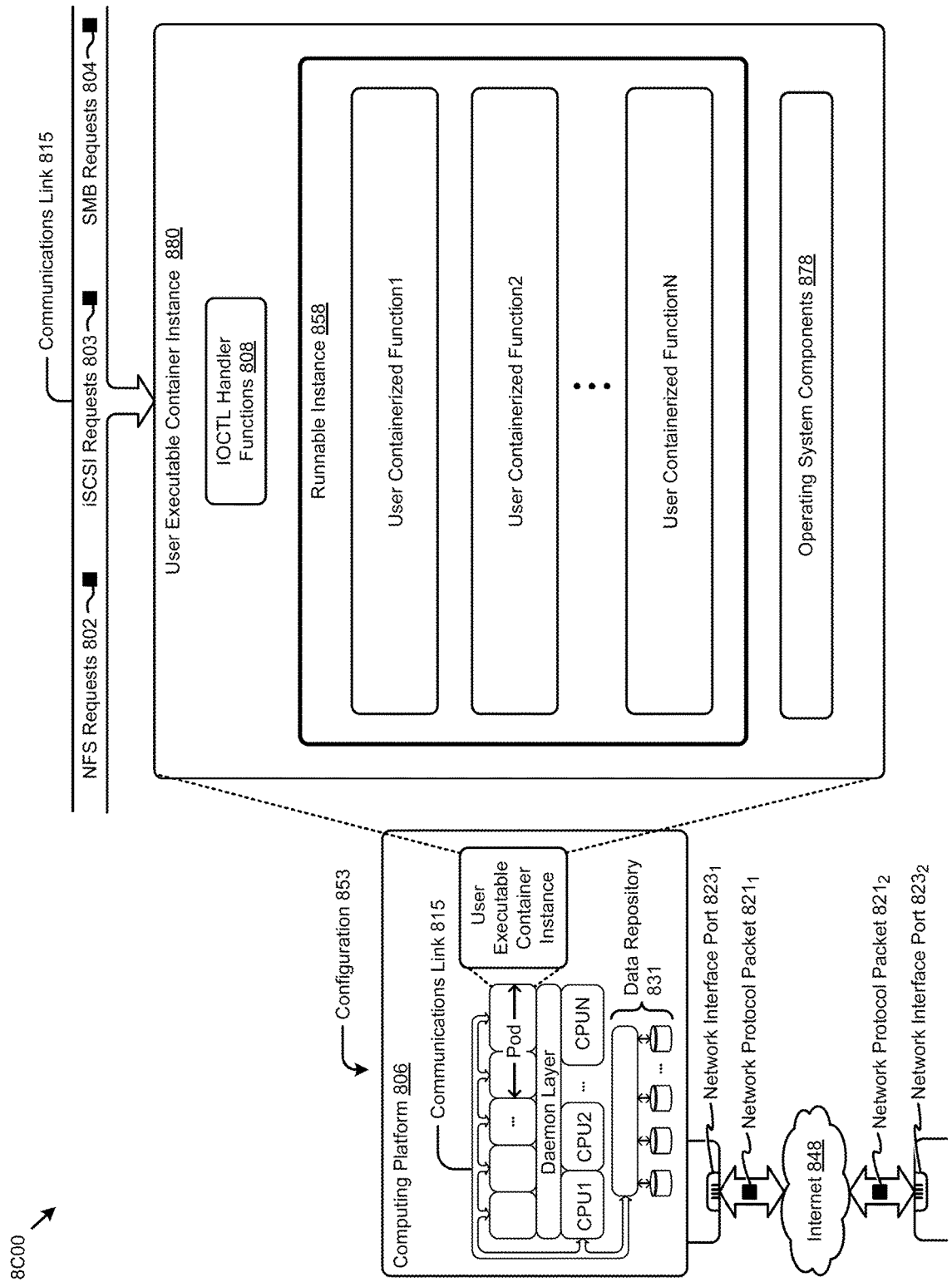

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts, the acts comprising:
bootstrapping an invocation of a microservice at a leader node in a first domain at least by installing a microservice registry and the microservice from an installation package that is sent to the leader node, wherein
a leader-follower relationship is established between the leader node and the follower node in a second domain, and
a server points to the microservices registry at the leader node; and
responsive to an event where the follower node is unable to reach the leader node, changing an entry in the server to point to a network address at the follower node in the second domain.

2. The non-transitory computer readable medium of claim 1, wherein the installation package comprises the microservice registry and the microservice.

3. The non-transitory computer readable medium of claim 1, wherein a microservice call is routed to the follower node that, responsive to the event where the leader node becomes unreachable by the follower node, processes the microservice call to the microservice using the microservices registry at the follower node.

4. The non-transitory computer readable medium of claim 3, wherein a domain name server (DNS) entry that points to a leader network address of the leader node is modified to point to the network address of the microservice at the follower node.

5. The non-transitory computer readable medium of claim 4, wherein the follower node modifies the domain name server (DNS) entry to point to the network address of the microservice at the follower node, and the microservice comprises an infrastructure microservice that bootstraps the infrastructure microservice itself.

6. The non-transitory computer readable medium of claim 1, wherein bootstrapping the invocation of the microservice comprises deploying the microservice registry to the follower node before instancing one or more computer image files for the follower node, and the microservice comprises an infrastructure microservice that bootstraps the infrastructure microservice to become operational prior to invocation of one or more classes of non-infrastructure services or applications that makes the one or more classes operational.

7. The non-transitory computer readable medium of claim 6, further comprising instructions which, when stored in the memory and executed by the processor cause the processor to perform further the set of acts, and the set of acts further comprising:
creating a volume group at the leader node from the microservice registry; and
creating a container instance within the volume group for a registry that comprises one or more required images for deployment and bringing up the microservice at the leader node.

8. A method, comprising:
bootstrapping an invocation of a microservice at a leader node in a first domain at least by installing a microservice registry and the microservice from an installation package that is sent to the leader node, wherein
a leader-follower relationship is established between the leader node and the follower node in a second domain, and
a server points to the microservices registry at the leader node; and
responsive to an event where the follower node is unable to reach the leader node, changing an entry in the server to point to a network address at the follower node in the second domain.

9. The method of claim 8, wherein the installation package comprises the microservice registry and the microservice.

10. The method of claim 8, wherein a microservice call is routed to the follower node that, responsive to the event where the leader node becomes unreachable by the follower node, processes the microservice call to the microservice using the microservices registry at the follower node.

11. The method of claim 10, wherein a domain name server (DNS) entry that points to a leader network address of the leader node is modified to point to the network address of the microservice at the follower node.

12. The method of claim 11, wherein the follower node modifies the domain name server (DNS) entry to point to the network address of the microservice at the follower node.

13. The method of claim 8, wherein the microservice comprises an infrastructure microservice that bootstraps the infrastructure microservice to become operational prior to invocation of one or more classes of non-infrastructure services or applications that makes the one or more classes operational.

14. The method of claim 13, further comprising:
creating a volume group at the leader node from the microservice registry; and
creating a container instance within the volume group for a registry that comprises one or more required images for deployment and bringing up the microservice at the leader node.

15. A system, comprising:
a processor; and
a storage medium having stored thereon a sequence of instructions which, when executed by the processor, causes the processor to perform a set of acts, the set of acts comprising:
bootstrapping an invocation of a microservice at a leader node in a first domain at least by installing a microservice registry and the microservice from an installation package that is sent to the leader node, wherein a leader-follower relationship is established between the leader node and the follower node in a second domain, and a server points to the microservices registry at the leader node; and responsive to an event where the follower node is unable to reach the leader node, changing an entry in the server to point to a network address at the follower node in the second domain.

16. The system of claim 15, wherein the installation package comprises the microservice registry and the microservice.

17. The system of claim 15, wherein a microservice call is routed to the follower node that, responsive to the event where the leader node becomes unreachable by the follower node, processes the microservice call to the microservice using the microservices registry at the follower node.

18. The system of claim 17, wherein a domain name server (DNS) entry that points to a leader network address of the leader node is modified to point to the network address of the microservice at the follower node.

19. The system of claim 18, wherein the follower node modifies the domain name server (DNS) entry to point to the network address of the microservice at the follower node.

20. The non-transitory computer readable medium of claim 1, wherein the microservice comprises an infrastructure microservice that bootstraps the infrastructure microservice to become operational prior to invocation of one or more classes of non-infrastructure services or applications that makes the one or more classes operational.

21. The system of claim 20, further comprising instructions which, when stored in the memory and executed by the processor cause the processor to perform further the set of acts, and the set of acts further comprising:

creating a volume group at the leader node from the microservice registry; and creating a container instance within the volume group for a registry that comprises one or more required images for deployment and bringing up the microservice at the leader node.

* * * * *

UNITED STATES PATENT AND TRADEMARK OFFICE
CERTIFICATE OF CORRECTION

| | | |
|---|---|---|
| PATENT NO. | : 12,086,606 B2 | Page 1 of 1 |
| APPLICATION NO. | : 18/176473 | |
| DATED | : September 10, 2024 | |
| INVENTOR(S) | : Pravin Singhal | |

It is certified that error appears in the above-identified patent and that said Letters Patent is hereby corrected as shown below:

In the Claims

Column 27, Line 33: in Claim 1, replace "the" in "the follower node" with "a".

Column 28, Line 21: in Claim 8, replace "the" in "the follower node" with "a".

Column 29, Line 2: in Claim 15, replace "the" in "the follower node" with "a".

Signed and Sealed this
Twenty-sixth Day of November, 2024

Katherine Kelly Vidal
*Director of the United States Patent and Trademark Office*